United States Patent
Kim et al.

(10) Patent No.: US 10,331,331 B2
(45) Date of Patent: Jun. 25, 2019

(54) DISPLAY DEVICE AND METHOD OF CONTROLLING DISPLAY DEVICE

(71) Applicant: SAMSUNG ELECTRONICS CO., LTD., Suwon-si (KR)

(72) Inventors: Jung-bum Kim, Seoul (KR); Sang-jun Ahn, Seongnam-si (KR); Bong-hoon Park, Suwon-si (KR); Soo-ryum Choi, Suwon-si (KR); Joon-hyun Choi, Suwon-si (KR); Chan-min Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 15/522,042

(22) PCT Filed: Nov. 9, 2015

(86) PCT No.: PCT/KR2015/011965
§ 371 (c)(1),
(2) Date: Apr. 26, 2017

(87) PCT Pub. No.: WO2016/072811
PCT Pub. Date: May 12, 2016

(65) Prior Publication Data
US 2017/0336939 A1    Nov. 23, 2017

Related U.S. Application Data

(60) Provisional application No. 62/076,726, filed on Nov. 7, 2014.

(51) Int. Cl.
*G06T 11/20*    (2006.01)
*G06T 15/00*    (2011.01)
(Continued)

(52) U.S. Cl.
CPC ............ *G06F 3/0488* (2013.01); *G06F 3/041* (2013.01); *G06T 11/20* (2013.01); *G06T 11/203* (2013.01);
(Continued)

(58) Field of Classification Search
CPC ....... G06T 11/20; G06T 15/00; G06T 11/203; G06T 15/005; G06T 15/30; G06F 3/041; G06F 3/0488
See application file for complete search history.

(56) References Cited

U.S. PATENT DOCUMENTS 6,707,473 B2   3/2004   Dresevic et al.
6,967,664 B1   11/2005  Taylor et al.
(Continued)

FOREIGN PATENT DOCUMENTS

JP    2010-092480 A    4/2010
KR    10-2009-0082907 A    7/2009
(Continued)

OTHER PUBLICATIONS

Communication dated Nov. 13, 2017, from the European Patent Office in counterpart European Application No. 15856486.4.
(Continued)

*Primary Examiner* — Sing-Wai Wu
(74) *Attorney, Agent, or Firm* — Sughrue Mion, PLLC

(57) ABSTRACT

A display device is provided. The display device includes: a graphic processing unit rendering strokes; a display displaying an image including the rendered strokes; and a processor identifying a redraw region when a redraw event occurs on the image, and providing rendering information for rendering strokes included in the redraw region to the graphic processing unit, wherein the graphic processing unit renders the strokes included in the redraw region using point primitives on the basis of the rendering information.

13 Claims, 11 Drawing Sheets

(51) Int. Cl.
*G06T 15/30* (2011.01)
*G06F 3/041* (2006.01)
*G06F 3/0488* (2013.01)

(52) U.S. Cl.
CPC ............ *G06T 15/00* (2013.01); *G06T 15/005* (2013.01); *G06T 15/30* (2013.01)

(56) References Cited

U.S. PATENT DOCUMENTS

| | | |
|---|---|---|
| 7,830,372 B2 | 11/2010 | Fry et al. |
| 7,847,798 B1 | 12/2010 | Parenteau et al. |
| 8,274,516 B2 | 9/2012 | Michail et al. |
| 8,773,459 B2 | 7/2014 | Jiao et al. |
| 8,928,667 B2 | 1/2015 | Nystad et al. |
| 2004/0008200 A1 | 1/2004 | Naegle et al. |
| 2006/0109275 A1 | 5/2006 | Cho |
| 2007/0152992 A1 | 7/2007 | Kohda et al. |
| 2008/0118148 A1 | 5/2008 | Jiao et al. |
| 2014/0043341 A1 | 2/2014 | Goel et al. |
| 2014/0313144 A1 | 10/2014 | Seto et al. |

FOREIGN PATENT DOCUMENTS

| | | |
|---|---|---|
| KR | 10-2011-0050630 A | 5/2011 |
| KR | 10-1228708 B1 | 2/2013 |
| KR | 10-2014-0126263 A | 10/2014 |
| KR | 10-2015-0041057 A | 4/2015 |

OTHER PUBLICATIONS

Mark J. Kilgard et al. "GPU-accelerated Path Rendering" ACM Transactions on Graphics, vol. 31, No. 6, Article 172, Nov. 2012, (10 pages total) XP055141685.

Communication dated Feb. 13, 2018, issued by the European Patent Office in counterpart European application No. 15856486.4.

Communication dated Mar. 17, 2018, issued by the Korean Intellectual Property Office in counterpart Korean application No. 10-2017-7011426.

International Search Report (PCT/ISA/210) dated Feb. 18, 2016 issued by the International Searching Authority in counterpart International Application No. PCT/KR2015/011965.

Written Opinion (PCT/ISA/237) dated Feb. 18, 2016 issued by the International Searching Authority in counterpart International Application No. PCT/KR2015/011965.

FIG. 1
(a)
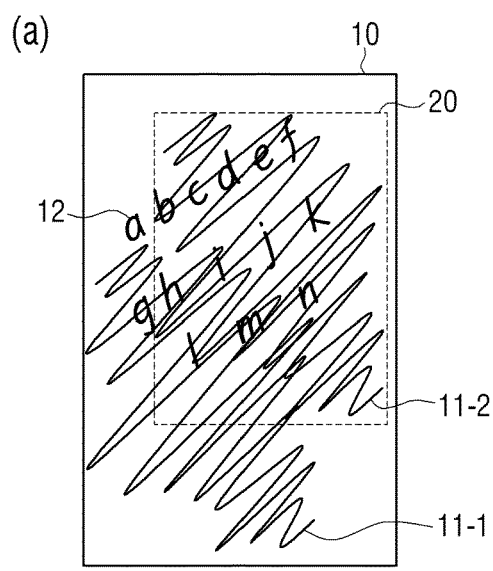
(b)
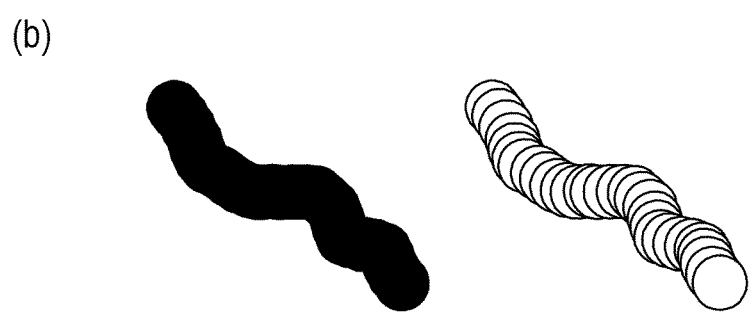
(c)
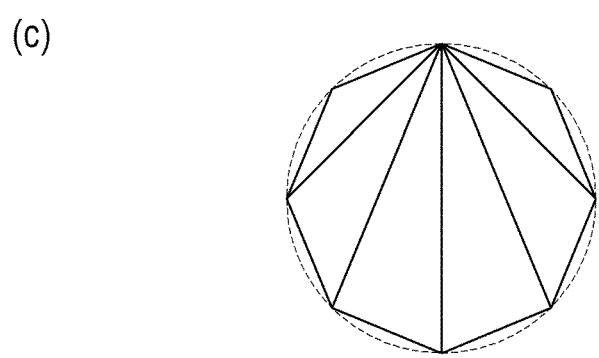

FIG. 5
(a)
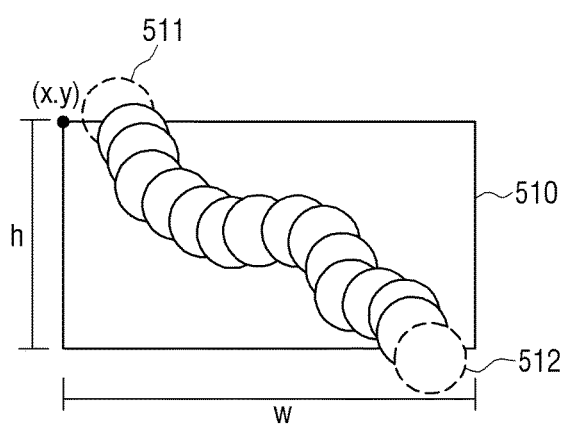
(b)
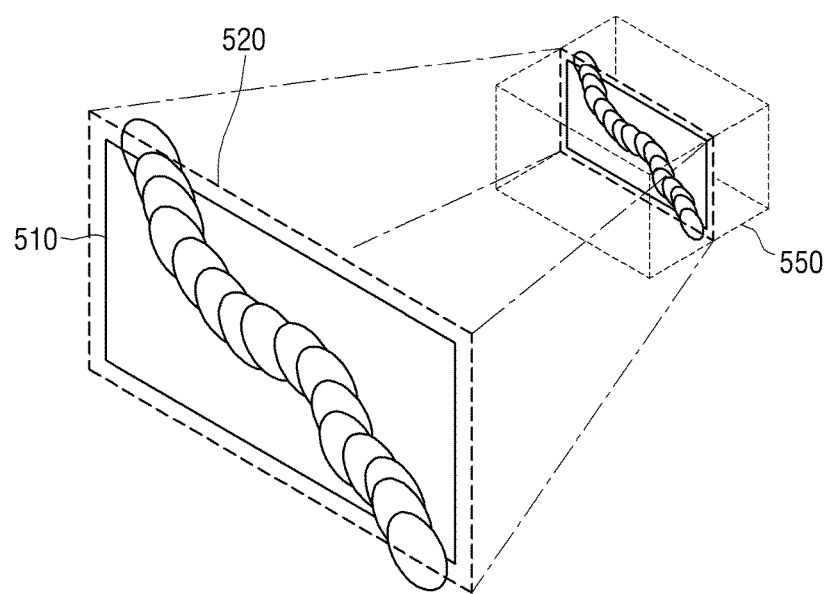

FIG. 6
(a)
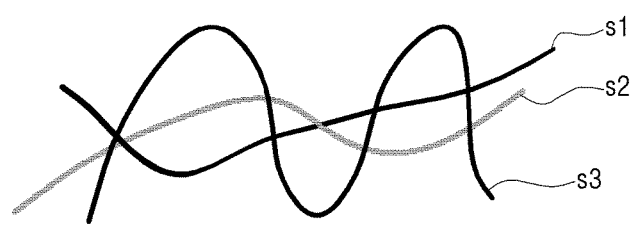
(b)
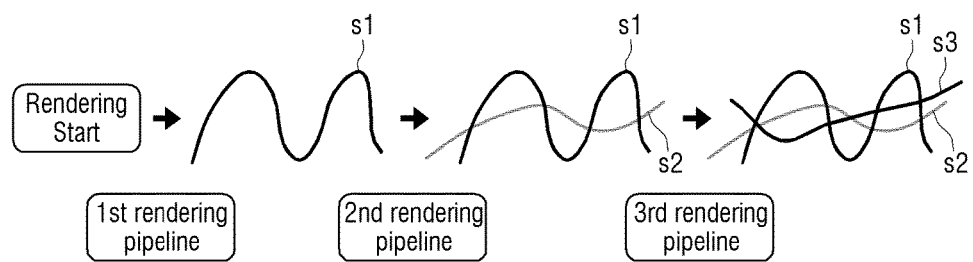
(c)
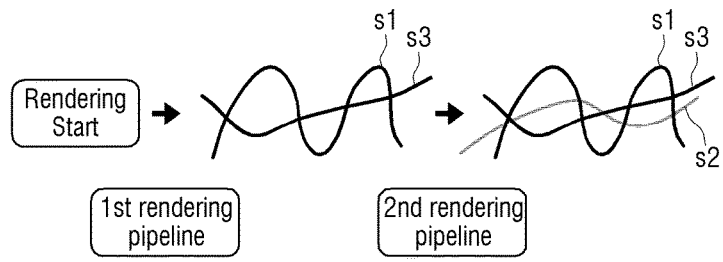

DISPLAY DEVICE AND METHOD OF CONTROLLING DISPLAY DEVICE

CROSS-REFERENCE TO RELATED APPLICATIONS

This application is a national stage entry of PCT/KR2015/011965, filed Nov. 9, 2015, which claims priority to U.S. provisional application 62/076,726 filed Nov. 7, 2014, the disclosures of which are incorporated herein in their entirety.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND

Technical Field

Apparatuses and methods consistent with the present disclosure relate to a display device and a method of controlling the display device, and more particularly, to a display device rendering a stroke using a graphic processing unit, and a method of controlling the display device.

Description of Related/Background Art

In accordance with the development of electronic technology, various kinds of display devices such as a television (TV), a mobile phone, a laptop computer, and a tablet personal computer (PC) have been developed and spread. In accordance with an increase in the use of the display devices, user's needs for various functions have increased. Therefore, a lot of efforts of manufacturers to satisfy the user's needs have been made, such that products having new functions that were not present in the related art have been successively launched.

Particularly, touch sensing technology has been applied to the recent display devices, such that users have been able to create and edit various documents or drawings by inputting strokes using their fingers or pens. Therefore, the users create documents or make drawings by inputting numerous lines, and a case of editing objects such as line/image/text during the creation of the document occurs.

In this case, the display device should invalidate regions occupied by the respective objects to redraw lines intersecting with the regions. Here, in the case in which regions of the edited objects and a large number of strokes intersect with each other, much time is required for the display device to render all the strokes, such that a delay is generated and use performance is deteriorated.

FIG. 1A illustrates such an example. In the case in which the user inputs an edition command for moving a stroke 11-1 to other position in a situation in which strokes 11-1 and 12 input through a touch screen 10 by the user are displayed, the display device moves a stroke 11-2 to the corresponding position depending on the user command and then redraw the stroke.

In this case, since a large number of strokes 11-2 and 12 included in a region 20 occupied by the stroke 11-2 and intersecting with each other are redrawn, much time is required, such that use performance is deteriorated.

To overcome the deterioration of the performance in the case in which a redrawing event occurs, a method of using a graphic processing unit (GPU) optimized for rendering primitives such as points or triangles in large quantities may be considered. Here, the primitive, which is a basic unit configuring a stroke, indicates a point, a triangle, or the like, one triangle primitive has three vertices, and one point primitive has one vertex.

Meanwhile, to realistically express a writing pressure of a finger or a pen, a method of drawing by connecting a large amount of circles to each other has been generally used. Sizes of the circles are determined depending on a pressure, an area, a speed, or the like, of a finger or pen input, and various kinds of pen style textures may be represented by filling texture images capable of representing a texture of the pen in the circles. FIG. 1B illustrates an example of the circle based stroke rendering as described above, and several circles are connected to each other as illustrated in the right drawing of FIG. 1B to draw a stroke as illustrated in the left drawing of FIG. 1B.

Generally, when a figure is drawn using the GPU, a target figure to be drawn is divided into triangles, and the triangles are transferred to the GPU. The figure divided into the triangles is called a mesh. To render a circle in a mesh form, the circle consists of several triangles as illustrated in FIG. 1C. That is, for example, in the case in which one of a plurality of circles configuring the stroke is intended to be rendered using the GPU as illustrated in the right drawing of FIG. 1B, the circle is configured in the mesh form using several triangle primitives. In this case, a predetermined number or more of triangles should be used so that the circle is smoothly drawn.

As a result, when the circle is rendered through the GPU according to the related art, a large number of vertices are required to smoothly draw the circle. However, when the number of vertices is increased, an amount of used memory is increased, and an amount of data that are to be transmitted from a central processing unit (CPU) to the GPU is also increased. Therefore, an amount of calculation that should be processed in the GPU is also increased, resulting in difficulty in obtaining optimal performance through the GPU.

Meanwhile, a series of processes of receiving a specific number (for example, the number of primitives configuring one stroke) of primitives and outputting the specific number of primitives on a screen are called a rendering pipeline of the GPU. Since a cost and a time are basically required for performing one process of the rendering pipeline, in the case of rendering the same input, it is advantageous in performance and power consumption to use rendering pipelines as small as possible.

In the related art, it was general to perform the rendering pipeline in one object unit, and in the case of rendering the stroke, it was general to perform one rendering pipeline per primitive such as the circle or perform one rendering pipeline per stroke. However, in the case in which one rendering pipeline is performed per primitive or per stroke as in the related art, when a large amount of short strokes such as a letter or a sentence are rendered, a large number of rendering pipelines should be performed, which causes a problem in performance and power of the display device.

DISCLOSURE

Technical Problem

The present disclosure provides a display device capable of rendering a stroke at a low power and a high performance when rendering the stroke using a graphic processing unit, and a method of controlling the display device.

SUMMARY

According to an aspect of the present disclosure, a display device includes: a graphic processing unit rendering strokes; a display displaying an image including the rendered strokes; and a processor identifying a redraw region when a redraw event occurs on the image, and providing rendering information for rendering strokes included in the redraw region to the graphic processing unit, wherein the graphic processing unit renders the strokes included in the redraw region using point primitives on the basis of the rendering information.

The rendering information may include conversion information for converting a region wider than the redraw region into a clip space.

The graphic processing unit may convert the redraw region into the clip space on the basis of the conversion information and render the strokes included in the redraw region using point primitives configuring strokes included in the converted clip space.

The processor may calculate the conversion information on the basis of a maximum radius of radii of a plurality of point primitives configuring the strokes included in the redraw region.

The conversion information includes the following matrix:

$$\begin{pmatrix} \frac{2}{w+2r} & 0 & 0 & \frac{2r}{w+2r}-1 \\ 0 & \frac{2}{h+2r} & 0 & \frac{2r}{h+2r}-1 \\ 0 & 0 & 0 & 0 \\ 0 & 0 & 0 & 1 \end{pmatrix}$$

where w indicates a width of the redraw region, h is a height of the redraw region, and r is the maximum radius.

The render information may include reverse conversion information for reversely converting the region wider than the redraw region, converted into the clip space, and the processor may calculate the reverse conversion information using a maximum radius of radii of a plurality of point primitives configuring the strokes included in the redraw region.

The reverse conversion information may include the following viewport information:

$(-r,-r,w+2r,h+2r)$ where w indicates a width of the redraw region, h is a height of the redraw region, and r is the maximum radius.

The display device may further include a touch input receiving the strokes that are input, wherein the rendering information includes depth information and style information of each of a plurality of strokes included in the redraw region, and the processor changes and allocates the depth information whenever styles of the strokes input through the touch input are changed.

The graphic processing unit may simultaneously render strokes having the same style information among the strokes included in the redraw region.

The graphic processing unit may render intersection points between strokes having different style information among the strokes included in the redraw region depending on the depth information.

The graphic processing unit may render the intersection points between the strokes having the different style information using a stroke of which a depth value included in the depth information is low among the strokes having the different style information.

According to another aspect of the present disclosure, a method of controlling a display device including a graphic processing unit includes: identifying a redraw region when a redraw event occurs on an image including strokes; providing rendering information for rendering strokes included in the redraw region to the graphic processing unit; and rendering, by the graphic processing unit, the strokes included in the redraw region using point primitives on the basis of the rendering information.

The rendering information may include conversion information for converting a region wider than the redraw region into a clip space.

The rendering may include: converting the redraw region into the clip space on the basis of the conversion information; and rendering the strokes included in the redraw region using point primitives configuring strokes included in the converted clip space.

The providing may include calculating the conversion information on the basis of a maximum radius of radii of a plurality of point primitives configuring the strokes included in the redraw region.

The conversion information includes the following matrix:

$$\begin{pmatrix} \frac{2}{w+2r} & 0 & 0 & \frac{2r}{w+2r}-1 \\ 0 & \frac{2}{h+2r} & 0 & \frac{2r}{h+2r}-1 \\ 0 & 0 & 0 & 0 \\ 0 & 0 & 0 & 1 \end{pmatrix}$$

where w indicates a width of the redraw region, h is a height of the redraw region, and r is the maximum radius.

The render information may include reverse conversion information for reversely converting the region wider than the redraw region, converted into the clip space, and the providing may include calculating the reverse conversion information using a maximum radius of radii of a plurality of point primitives configuring the strokes included in the redraw region.

The reverse conversion information may include the following viewport information:

$(-r,-r,w+2r,h+2r)$ where w indicates a width of the redraw region, h is a height of the redraw region, and r is the maximum radius.

The display device may further include a touch input receiving the strokes that are input, the method of controlling a display device may further include changing and allocating the depth information when styles of the strokes input through the touch input are changed, wherein in the providing, the depth information and the style information for the strokes included in the redraw region are provided as the rendering information to the graphic processing unit.

In the rendering, strokes having the same style information among the strokes included in the redraw region may be simultaneously rendered.

In the rendering, intersection points between strokes having different style information among the strokes included in the redraw region may be rendered depending on the depth information.

In the rendering, the intersection points between the strokes having the different style information may be rendered using a stroke of which a depth value included in the depth information is low among the strokes having the different style information.

Advantageous Effects

According to the diverse exemplary embodiments of the present disclosure as described above, the stroke rendering performance of the display device may be improved, and the consumed power may be decreased.

BRIEF DESCRIPTION OF THE DRAWINGS

FIGS. 1A to 1C are views for describing a problem according to the related art and the background art.

FIGS. 5A and 5B are views for describing a method of rendering a stroke using point primitives according to an exemplary embodiment of the present disclosure.

FIGS. 6A to 7 are illustrative views for describing a method of rendering a stroke using style information and depth information of a stroke according to another exemplary embodiment of the present disclosure.

DETAILED DESCRIPTION AND BEST MODE

When it is decided that a detailed description for the known art related to the present disclosure may unnecessary obscure the gist of the present disclosure, it will be omitted. In addition, terms "~er (or ~or)" for components used in the following description are used only to easily make the disclosure. Therefore, these terms do not have meanings or roles that distinguish from each other in themselves.

Figure 2:
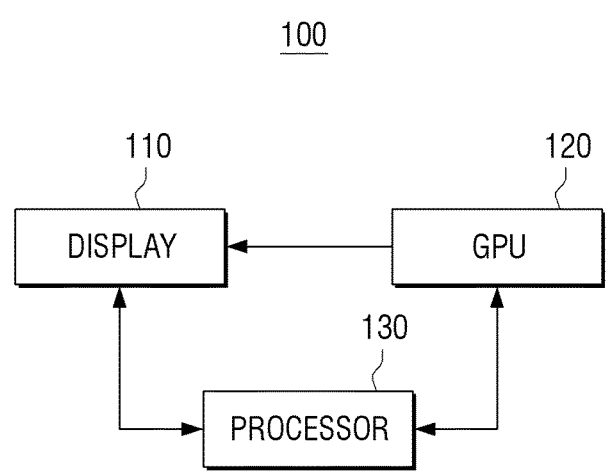
FIG. 2 is a block diagram illustrating a configuration of a display device according to an exemplary embodiment of the present disclosure.

FIG. 2 is a block diagram illustrating a configuration of a display device according to an exemplary embodiment of the present disclosure. As illustrated in FIG. 2, the display device 100 includes a display 110, a graphic processing unit (GPU) 120, and a processor 130. Here, the display device 100 may be implemented by various types of electronic devices such as a television (TV), a smart phone, a tablet personal computer (PC), a digitizer, a laptop computer, a monitor, an electronic bulletin board, an electronic table, and a large format display.

The display 110 displays various images. Particularly, the display 110 may display strokes rendered by the graphic processing unit 120. Here, the stroke, which is a line included in an image (for example, a text or a drawing) created by a user, may mean one line unit seamlessly connected from one end to the other end. For example, the stroke may be one stroke of a numeral or a character, one line configuring a drawing, or the like, but is not limited thereto.

Meanwhile, the display 110 may be implemented to include various kinds of display panels such as a liquid crystal display (LCD), an organic light emitting diode (OLED), a plasma display panel (PDP), or the like, and may be implemented in a touch screen form including a touch panel.

The processor 130 controls a general operation of the display device 100. Particularly, when a redraw event occurs on the image displayed on the display 110 and including the strokes, the processor 130 may identify a redraw region and provide rendering information for rendering strokes included in the identified redraw region to the graphic processing unit.

Here, the redraw event is an event for redrawing at least a portion of the image including the stroke, and for example, in the case in which an edition command of the user for a partial region or a partial stroke of the text or the drawing displayed on the display 110 is present, a redraw event for a stroke included in a corresponding edition region may occur.

However, the occurrence of the redraw event is not limited thereto. For example, the redraw event may occur also in the case in which a refresh command for a document image or a drawing image that is being edited is present. In the present disclosure, a kind of redraw event is not limited.

When the redraw event as described above occurs, the processor 130 may identify a region in which a redraw operation is performed on the image, that is, a redraw region. Here, the redraw region, which is a region in which the stroke included in the image is redrawn depending on the redraw event, may be, for example, an edition region depending on an edition command of the user, but is not limited thereto. Here, the edition region may have a quadrangular shape such as a bounding box.

The processor 130 may provide the rendering information for rendering the strokes included in the redraw region to the graphic processing unit 120. In this case, according to an exemplary embodiment of the present disclosure, the rendering information may include conversion information for converting a region wider than the redraw region into a clip space, reverse conversion information for reversely converting the space wider than the redraw region, converted into the clip space, into a display region having the same size as that of the redraw region, information on primitives configuring the strokes, and the like.

In detail, to render the strokes using the graphic processing unit, a process of converting all vertices of primitives configuring the strokes into the clip space to cut primitives positioned outside the clip space and reversely converting only primitives positioned inside the clip space into a display space is performed. In this process, the processor 130 calculates or obtains the rendering information required by the graphic processing unit to render the strokes and provides the rendering information to the graphic processing unit 120.

Therefore, the graphic processing unit 120 may render the strokes using the rendering information provided from the processor 130.

Particularly, according to an exemplary embodiment of the present disclosure, the processor 130 may provide coordinate information and radius information of the respective point primitives configuring the corresponding stroke and the conversion information and the reverse conversion information described above to the graphic processing unit 120 so that the graphic processing unit 120 may render the stroke included in the redraw region using point primitives, and the graphic processing unit 120 may render the stroke included in the redraw region using the point primitives on the basis of the rendering information provided from the processor 130.

As described above, since one circle may be represented by one vertex by rendering the stroke using the point primitives, the stroke may be represented using a smaller amount of vertices as compared with a method of rendering a circle configuring a stroke on the basis of a mesh. Therefore, an amount of processed data is decreased, such that high performance stroke rendering becomes possible.

Meanwhile, according to an exemplary embodiment of the present disclosure, the processor 130 may provide the conversion information for converting the region wider than the identified redraw region into the clip space as the rendering information to the graphic processing unit 120. This is to prevent a stroke disconnection phenomenon that may occur at the time of rendering the stroke included in the redraw region using the point primitives by a general method of rendering the primitives by the graphic processing unit. A detailed content for the stroke disconnection phenomenon will be described below with reference to FIG. 4.

In detail, the processor 130 may calculate the conversion information and the reverse conversion information on the basis of a maximum radius of radii of a plurality of point primitives configuring the strokes included in the redraw region, and provide the calculated conversion information and reverse conversion information to the graphic processing unit 120.

For example, when a width of the redraw region is w, a height of the redraw region is h, and the maximum radius of the radii of the plurality of point primitives configuring the strokes included in the redraw region is r, the processor 130 may calculate conversion information such as a matrix of the following Equation 1 and provide the calculated conversion information to the graphic processing unit 120.

$$\begin{pmatrix} \frac{2}{w+2r} & 0 & 0 & \frac{2r}{w+2r}-1 \\ 0 & \frac{2}{h+2r} & 0 & \frac{2r}{h+2r}-1 \\ 0 & 0 & 0 & 0 \\ 0 & 0 & 0 & 1 \end{pmatrix}$$ [Equation 1]

A general clip space is a space in which each of x, y, and z axes has a range of −1 to 1. Therefore, the region wider than the redraw region may be converted into the clip space through such a matrix.

Meanwhile, as described above, in a process of converting the region wider than the redraw region into the clip space, the primitives positioned outside the clip space are clipped, which is called clipping. Therefore, the graphic processing unit 120 converts the redraw region into the clip space using the above matrix and then renders the strokes in the redraw region using only the point primitives present inside the clip space in a reverse conversion process.

Meanwhile, since the redraw region wider than the clip space is converted into the clip space, in the case in which the converted clip space is reversely converted as it is, a case in which the stroke rendered in the redraw region becomes shorter than an actual stroke may occur. Therefore, the processor 130 may provide reverse conversion information as represented by the following Equation 2 to the graphic processing unit 120 using the maximum radius r described above according to an exemplary embodiment of the present disclosure to correct this case.

$$(-r, -r, w+2r, h+2r)$$ [Equation 2]

Therefore, the graphic processing unit 120 reversely converts the clip space using the reverse conversion information to render the point primitives present inside the clip space in the redraw region, thereby making it possible to prevent the stroke disconnection phenomenon of the redraw region that may occur by rendering the stroke using the point primitives.

Figure 3:
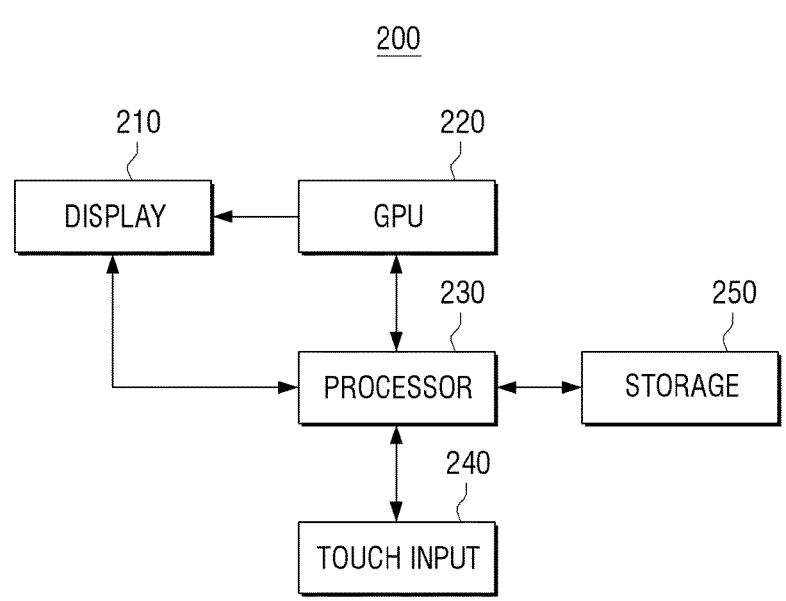
FIG. 3 is a block diagram illustrating a configuration of a display device according to another exemplary embodiment of the present disclosure.

FIG. 3 is a block diagram illustrating a configuration of a display device according to another exemplary embodiment of the present disclosure. According to FIG. 3, the display device 200 may include a display 210, a graphic processing unit 220, a processor 230, a touch input 240, and a storage 250. The display 210, the graphic processing unit 220, and the processor 230 of FIG. 3 may perform all of the functions and the operations of the display 110, the graphic processing unit 120, and the processor 130 described through FIG. 2. Therefore, an overlapped description for the same components as those described through FIG. 2 will be omitted in describing FIG. 3.

The touch input 240 receives a touch input of the user. Particularly, the touch input 240 may receive strokes input by the user using a finger or an input device (for example, a pen). As described above, the strokes input through the touch input 240 may be displayed on the display 210 under a control of the processor 230.

To this end, the touch input 240 may include a touch panel. In this case, various schemes such as a resistive scheme, a capacitive scheme, a surface acoustic wave (SAW) scheme, an infrared scheme, an optical scheme, and an electromagnetic induction scheme may be used as a touch sensing scheme of the touch panel. In addition, the touch input 240 may be configured separately from the display 210 or be configured integrally with the display 210 in a touch screen form.

Meanwhile, according to an exemplary embodiment of the present disclosure, the processor 230 may provide style information and depth information of each of a plurality of strokes included in a redraw region as rendering information to the graphic processing unit 220.

Here, the style information of the strokes, which is information on a style of an input device used to draw the strokes, may include color information, kind information of a pen, or the like. Here, kinds of pens may be different from each other in the case in which pens becomes different from each other by selecting various kinds of pens provided by a stroke rendering application capable of creating a document or making a drawing by inputting strokes even though pens are physically the same as each other as well as in the case in which pens themselves become physically different from each other.

Meanwhile, the depth information, which is information indicating a sequence of input strokes, may be information changed whenever the styles of the input strokes are changed and granted to the corresponding strokes, according to an exemplary embodiment of the present disclosure.

In detail, the processor 230 may allocate a current depth value to the corresponding stroke when one stroke of a specific style is input through the touch input 240, and may then allocate the same depth value to each stroke when the style of the stroke is not changed. When the style of the input stroke is changed, the processor 230 may change the depth value and allocate the changed depth value to the stroke of which the style is changed. As described above, the processor 230 may match depth values to each of the plurality of strokes input through the touch input 240 and store the matched depth values as the depth information in the storage 250. In addition, the processor 230 may match styles of the plurality of strokes input through the touch input 240 to the respective strokes and store the matched styles as the style information in the storage 250.

Then, when a redraw event occurs on an image including the plurality of strokes displayed on the display 210, the processor 230 may identify a redraw region, and provide depth information and style information on strokes included in the redraw region among the depth information and the style information stored in the storage 250 to the graphic processing unit.

Therefore, the graphic processing unit 220 may simultaneously render strokes having the same style information among the strokes included in the redraw region. In detail, the graphic processing unit 220 may render the strokes having the same style information by one rendering pipeline. In this case, the graphic processing unit 220 may render intersection points between strokes having different style information among the strokes included in the redraw region depending on the depth information.

For example, in the case in which the user inputs a first stroke of style a, changes a style of a pen to input a second stroke of style b, and then again changes the style of the pen into style a to input a third stroke so that the first to third strokes intersect with each other, through the touch input 240, the processor 230 may allocate a depth value of 100 to the first stroke of style a and store style information and depth information of the first stroke in the storage 250. Then, since the style of the second stroke is changed, the processor 230 may allocate a changed depth value of 99 to the second stroke and store style information and depth information of the second stroke in the storage 250. Since the style of the finally input third stroke is changed from style b of the second stroke into style a, the processor 230 may change the depth value into 98, allocate the depth value of 98 to the third stroke, and store style information and depth information in the storage 250.

Then, when a redraw event occurs in an image region including the first to third strokes, the processor 230 may provide the style information and the depth information on the first to third strokes as rendering information to the graphic processing unit 220.

Therefore, the graphic processing unit 220 may simultaneously render the first stroke and the third stroke having the same style information of a and then render the second stroke of style b. The graphic processing unit 220 may also render the second stroke and then simultaneously render the first and third strokes.

In this case, when the graphic processing unit 220 renders an intersection point between the first stroke and the second stroke having different style information, since the depth value (99) of the second stroke is lower than the depth value (100) of the first stroke, the graphic processing unit 220 may render the intersection point between the first stroke and the second stroke using the second stroke.

In addition, when the graphic processing unit 220 renders an intersection point between the second stroke and the third stroke having different style information, the graphic processing unit 220 may render the intersection point between the second stroke and the third stroke using the third stroke having a lower depth value.

As described above, according to an exemplary embodiment of the present disclosure, the strokes having the same style information are simultaneously rendered by one rendering pipeline, thereby making it possible to decrease the number of times of the performed rendering pipeline. In addition, the intersection point between the strokes having the different style information is rendered depending on the depth information, thereby making it possible to accurately represent a sequence of the strokes input by the user even though the strokes having the same style information are simultaneously rendered.

Meanwhile, when the redraw event occurs, the processor 230 may provide the coordinate information and the radius information of the respective point primitives configuring the corresponding strokes and the conversion information and the reverse conversion information described above as the rendering information to the graphic processing unit 220 so that the graphic processing unit 220 may render the strokes included in the redraw region using point primitives as described above through FIG. 2, in addition to the style information and the depth information included in the redraw region.

Therefore, even when the graphic processing unit 220 renders the plurality of strokes included in the redraw region depending on the style information and the depth information, the graphic processing unit 220 may render the plurality of strokes using the point primitives. As described above, a detailed content for using the depth information together when the graphic processing unit 220 renders the strokes using the point primitives according to an exemplary embodiment of the present disclosure will be described in detail below through FIG. 8.

Meanwhile, in the case of an exemplary embodiment in which the graphic processing unit 220 renders the plurality of strokes included in the redraw region depending on the style information and the depth information as described through the FIG. 3, the graphic processing unit 220 does not necessarily render the respective strokes using the point primitives.

For example, an exemplary embodiment in which the processor 230 provides vertex information of all triangle primitives configuring the strokes, conversion information for converting the redraw region into a clip region, and reverse conversion information for reversely converting the converted clip region as rendering information to the graphic processing unit 220, in addition to the style information and the depth information of the strokes included in the redraw region, and the graphic processing unit 220 renders the strokes using the triangle primitives on the basis of the style information and the depth information of the strokes included in the redraw region will be possible.

The storage 250 may store various programs and data for an operation of the display device 200 therein. In addition, the storage 250 may also perform a temporary storing function of data generated during an operation of the display device 200.

Particularly, the storage 250 may store various rendering information therein. For example, the storage 250 may store the vertex information of the respective primitives configuring the strokes input through the touch input 240 (particularly, the coordinate information and the radius information of the respective point primitives), the conversion information for converting the redraw region or the region wider than the redraw region into the clip space, the reverse conversion information for reversely converting the converted clip space into a display region (particularly, the redraw region), the depth information indicating a sequence of the plurality of strokes input through the touch input 240 and related to depths matched to the respective strokes, and the style information of the plurality of strokes therein.

In addition, the storage 250 may store various program modules for an operation of the display device 200 described above therein. For example, the storage 250 may include a document creating module capable of inputting and editing a stroke to create an image document including a text or a drawing, a user interface (UI) module for interacting between the display device 200 and the user, a stroke rendering module for performing operations of the processor 230 and the graphic processing unit 220 according to diverse exemplary embodiments of the present disclosure described above, and the like. Therefore, the processor 230 may read various modules stored in the storage 250 to perform operations of the display device 200 according to the diverse exemplary embodiments of the present disclosure described above.

Meanwhile, although a case in which the graphic processing unit 120 or 220 actively renders the strokes using the rendering information when the processor 130 or 230 provides the rendering information is described by way of example hereinabove, this is only an example for convenience of explanation, and the present disclosure is not limited thereto. That is, the graphic processing unit 120 or 220 may render the strokes under a control of the processor 130 or 230 using the rendering information.

Figure 4:
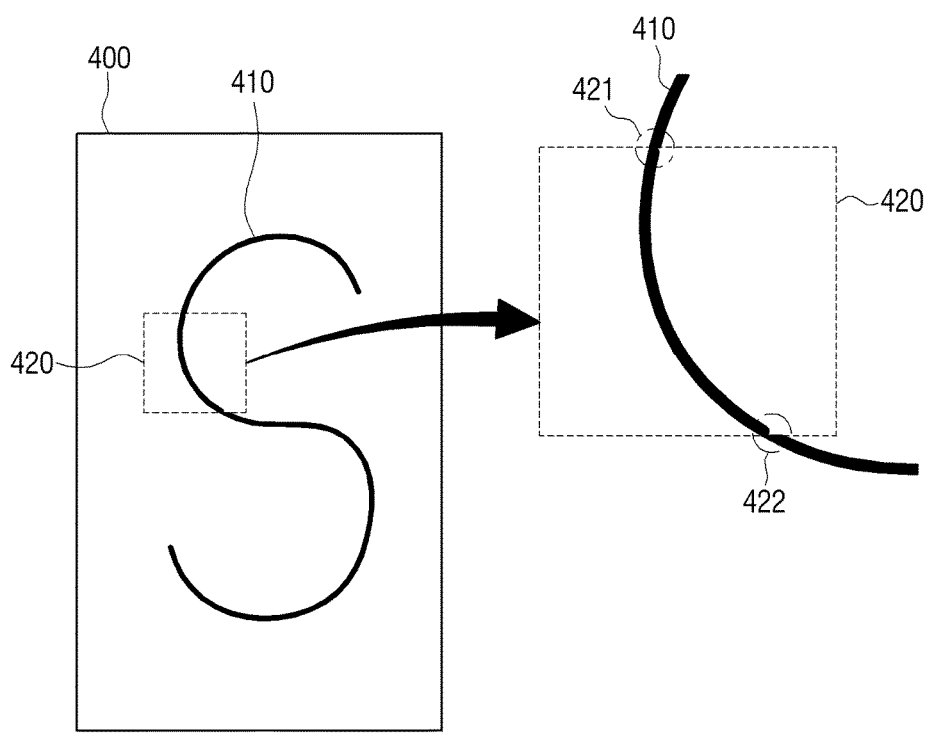
FIG. 4 is an illustrative view illustrating a problem that may occur at the time of rendering a stroke using point primitives.

Hereinafter, a method of rendering a stroke using point primitives according to an exemplary embodiment of the present disclosure will be described in more detail through FIGS. 4 to 5B. FIG. 4 is an illustrative view illustrating a problem that may occur at the time of rendering a stroke using point primitives. In detail, a left drawing of FIG. 4 illustrates a state in which a redraw process is performed using point primitives due to a redraw event occurring in a partial region 420 of an image including one stroke 410 in a situation in which the image is displayed on a display screen 400, and a right drawing of FIG. 4 is an enlarged view of the redraw region 420.

That is, in the case in which the graphic processing unit renders the stroke included in the redraw region 420 using the point primitives by the general method, stroke disconnection portions 421 and 422 from the outside of the redraw region 420 may be generated as illustrated in the right drawing of FIG. 4. This problem occurs due to specifications such as OpenGL, OpenGL ES, or the like, which is a standard 3D graphic application programming interface (API) used by the graphic processing unit as described below.

To render primitives such as triangle primitives or point primitives using the graphic processing unit in the specifications, all the vertices configuring the primitives need to be converted into a clip space. Here, the clip space is a space in which each of x, y, and z axes has a range of −1 to 1. Since primitives positioned outside the clip space after the primitives are converted into the clip space are portions that are not viewed on the display screen, the graphic processing unit clips the primitives positioned outside the clip space for the purpose of efficient rendering, and this process is called clipping.

When the primitives are clipped depending on the specifications as described above, in the case of the triangle primitives, only portions positioned outside the clip space are cut, and thus, portions present inside the clip space in a triangle may be rendered.

However, in the case of the point primitives, when central points of points are positioned outside the clip space, the point primitives themselves are excluded in a rendering process. As described above, the point primitives that needs to be output on the display screen, but are not rendered are generated, such that a stroke disconnection phenomenon occurs.

In more detail, in the case in which the central points of the point primitives are positioned outside the clip space and some of the point primitives are positioned inside the clip space due to a large radius, these point primitives are excluded in the rendering process at the time of performing the rendering depending on general specifications even though they need to be included in the rendering. That is, a phenomenon that the point primitives are excluded in the rendering process occurs at a boundary of the redraw region, such as portions represented by reference numerals 421 and 422 on the right drawing of FIG. 4, such that the stroke is viewed as if it is disconnected.

To solve such a problem, the processor 130 or 230 according to the present disclosure may calculate the conversion information for converting the point primitives configuring the stroke included in the redraw region into the clip space and the reverse conversion information for reversely converting the point primitives included in the converted clip space into the redraw region, which is one region of the display 110 or 210, to be different from conversion and reverse conversion information depending on general specifications, and provide the calculated conversion information and reverse conversion information to the graphic processing unit 120 or 220. FIGS. 5A and 5B are views for describing a method of rendering a stroke using point primitives according to an exemplary embodiment of the present disclosure.

FIG. 5A illustrates a plurality of point primitives configuring a stroke included in a redraw region 510 in the case in which a coordinate of a left upper end point of the redraw region 510 is (x, y) on the basis of a screen of an entire display 110 or 210 and a width and a height of the redraw region are w and h, respectively. As described above, in the case in which the redraw region is converted into the clip space depending on the general specifications, point primitives 511 and 512 positioned at a boundary of the redraw region 510 may be excluded in the rendering process.

Therefore, according to an exemplary embodiment of the present disclosure, the processor 130 or 230 may move positions of the respective point primitives by (−x, −y) and provide the moved position of the respective point primitives to the graphic processing unit 120 or 220, to relatively change the positions of the respective point primitives configuring the stoke included in the redraw region 510 in the redraw region.

In addition, the processor 130 or 230 may identify a maximum radius of radii of the plurality of point primitives configuring the stroke included in the redraw region 510, and may calculate the matrix as represented by the above Equation 1 as conversion information and provide the calculated matrix to the graphic processing unit 120 or 220 in the case in which the identified maximum radius is, for example, r.

Therefore, when the graphic processing unit 120 or 220 converts the redraw region 510 into the clip space using the position information of the respective point primitives and the matrix that are provided, a region 520 wider than the redraw region 510 is converted into a clip space 550, as illustrated in FIG. 5B. Here, referring to FIG. 5B, it may be seen that the conversion is performed so that all the point primitives including the point primitives 511 and 512 positioned at the boundary of the redraw region 510 are positioned inside the clip space 550.

That is, when the redraw region is converted into the clip space through the conversion matrix, the conversion is performed so that central points of all the point primitives of which portions are included in the redraw region are present inside the clip space, and thus, omitted point primitives disappear.

Meanwhile, since the region wider than the actual redraw region is converted into the clip space through the matrix as represented by the above Equation 1, in the case of providing the reverse conversion information to the graphic processing unit by the general method depending on the specifications described above, the stroke is displayed at a size smaller than an actual size.

Therefore, according to an exemplary embodiment of the present disclosure, the processor 130 or 230 may calculate the reverse conversion information as represented by the above Equation 2 using the width w and the height h of the redraw region 510 and the maximum radius r described above and provide the calculated reverse conversion information to the graphic processing unit 120 or 220, to correct such a problem. Therefore, when the graphic processing unit 120 or 220 reversely converts the clip space using the provided reverse conversion information, the stroke having the same size as the actual size may be rendered in the redraw region 510.

The reverse conversion information described above is obtained by correcting parameters included in viewport information stated in the conventional specifications according to an exemplary embodiment of the present disclosure. Therefore, as a detailed method of performing reverse conversion using the respective parameter values included in the reverse conversion information, a method according to the conventional specifications may be used. However, since it is unrelated to the gist of the present disclosure, a detailed description therefor will be omitted.

Meanwhile, although a process in which the graphic processing unit 120 or 220 converts the redraw region into the clip space when the processor 130 or 230 provides the moved position information of the respective point primitives and the conversion information and then reversely converts the clip space to render the stroke included in the redraw region when the processor 130 or 230 provides the reverse conversion information is described in the description for FIGS. 5A and 5B described above, this is only an example for assisting in the understanding of a process of rendering the stroke, and the present disclosure is not limited thereto.

That is, the processor 130 or 230 may provide all of the data required for the graphic processing unit 120 or 220 to render the stroke, such as the moved position information of the respective point primitives included in the redraw region, the conversion information, and the reverse conversion information to the graphic processing unit 120 or 220 when a redraw event occurs, and the graphic processing unit 120 or 220 may then render the stroke depending on a rendering command of the processor 130 or 230.

Figure 7:
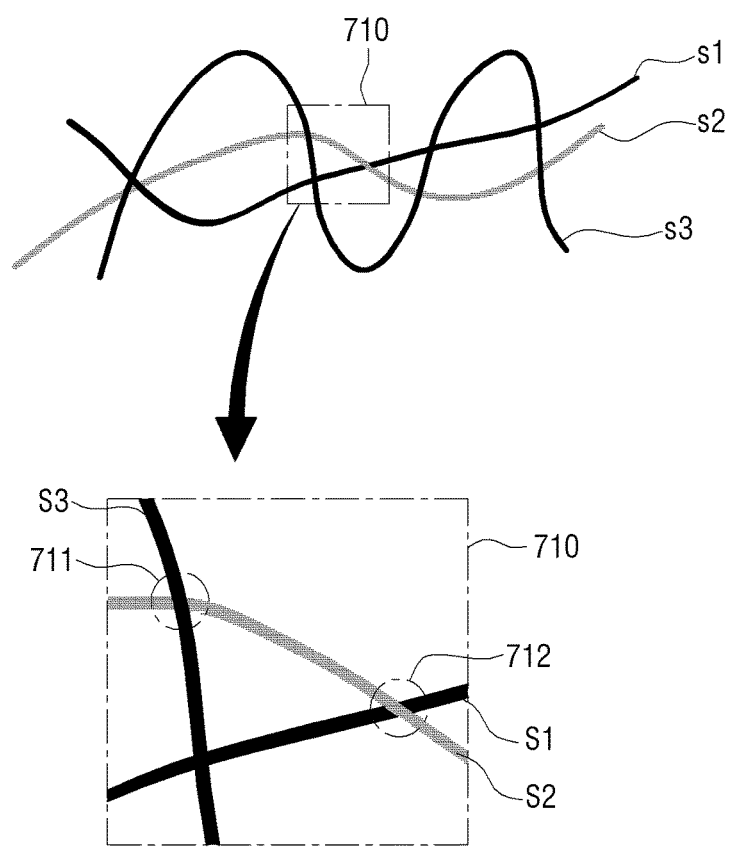

FIGS. 6A to 7 are illustrative views for describing a method of rendering a stroke using style information and depth information of a stroke according to another exemplary embodiment of the present disclosure. FIGS. 6A to 6C are illustrative views for comparing and describing methods of rendering a stroke according to the related art and an exemplary embodiment of the present disclosure with each other.

In detail, FIG. 6A illustrates a case in which the user sequentially inputs a first stroke (hereinafter, referred to as s1), a second stroke (hereinafter, referred to as s2), and a third stroke (hereinafter, referred to as s3) through the touch input 240. In this case, the user inputs s1 and s3 using a pen of the same 'pencil' style and inputs s2 using a pen of an 'ink pen' style different from that of s1 and s3, and s1, s2, and s3 have intersection points therebetween.

In the method of rendering a stroke using the graphic processing unit according to the related art, the stroke is rendered by one rendering pipeline per stroke. Therefore, when a redraw event occurs in a region including s1, s2, and s3, the graphic processing unit performs a first rendering pipeline after start of rendering to render s1, performs a second rendering pipeline to render s2, and performs a third rendering pipeline to render s3 in a sequence of the strokes input by the user, as illustrated in FIG. 6B.

However, in the case in which a large amount of short strokes are present in the redraw region such as a case of editing a sentence input by the user, when the strokes are rendered by performing one rendering pipeline per stroke by the method according to the related art, a large amount of rendering pipelines are performed, such that performance is deteriorated and much power is consumed.

To solve this problem, according to an exemplary embodiment of the present disclosure, the graphic processing unit 220 performs the one same rendering pipeline on strokes having the same style to render the strokes.

In detail, the processor 230 may change and allocate depth information to the respective strokes whenever a style of the stroke input through the touch input 240 is changed, and store the depth information allocated to the respective strokes in the storage 250. For example, when s1, s2, and s3 are sequentially input while changing a pen style as illustrated in FIG. 6A, the processor 230 may allocate '100', which is a current depth value, to s1 of the initially input 'pencil' style, and store '100' in the storage. Since the pen style in the subsequently input s2 is changed from the 'pencil' to the 'ink pen', the processor 230 may change the depth value, allocate '99', and store '99' in the storage, and since the pen style in s3 is again changed from the 'ink pen' to the 'pencil', the processor 230 may allocate '98', which is a changed depth value, and store '98' in the storage.

In addition, the processor 230 may match the pen styles of the respective strokes to the respective strokes and store the matched pen styles as style information in the storage 250. For example, the processor 230 may match the 'pencil' to s1 and s3 and match the 'ink pen' to s2, and store the matched pen styles as the style information.

Then, when the redraw event again occurs in the display region including s1, s2, and s3, the processor 230 may provide the style information and the depth information of each of s1, s2, and s3 included in the redraw region to the graphic processing unit 220.

Therefore, the graphic processing unit 220 may perform the first rendering pipeline after the start of the rendering to simultaneously render s1 and s3 having the same style information of the 'ink pen' and perform the second rendering pipeline to render s2 of the 'pencil' style, regardless of the sequence of the strokes input by the user, as illustrated in FIG. 6C.

In this case, since s1, s2, and s3 have the intersection points therebetween, an input sequence of the strokes having different styles needs to be represented at the intersection points between the respective strokes. To this end, the graphic processing unit 220 may render the intersection points between strokes having the different style information among the strokes included in the redraw region depending on the depth information.

In detail, the graphic processing unit 220 may render the intersection points between the strokes having the different style information using a stroke having the lowest depth information among the strokes having the different style information.

FIG. 7 illustrates an example in which the graphic processing unit 220 renders the intersection points between the strokes having the different styles using the depth information to represent the sequence of the strokes input by the user, even though the strokes having the same style are simultaneously rendered regardless of the sequence of the strokes input by the user as illustrated in FIG. 6C.

As described above, each depth information of s1, s2, and s3 is 100, 99, and 98, respectively. Therefore, referring to an enlarged view of a region denoted by reference numeral 710, it may be seen that the graphic processing unit 220 renders an intersection point 712 between s1 and s2 using s2, having lower depth information, of s1 and s2 and renders an intersection point 711 between s2 and s3 using s3, having lower depth information, of s2 and s3.

As described above, according to the exemplary embodiment of the present disclosure described above, even though the strokes having the same pen style are rendered by one rendering pipeline, the sequence of the strokes input by the user may be represented using the depth information of the strokes, such that a consumed current may be decreased and the strokes may be accurately rendered.

Meanwhile, although a case in which the depth values that are gradually decreased whenever the styles of the strokes input through the touch input 240 are changed are allocated is described by way of example hereinabove, the present disclosure is not limited thereto. For example, an exemplary embodiment in which the depth values that are gradually increased whenever the styles of the strokes are changed are allocated will also be possible. In this case, the intersection points between the strokes having the different styles may be rendered using a stroke having a high depth value.

Figure 8:
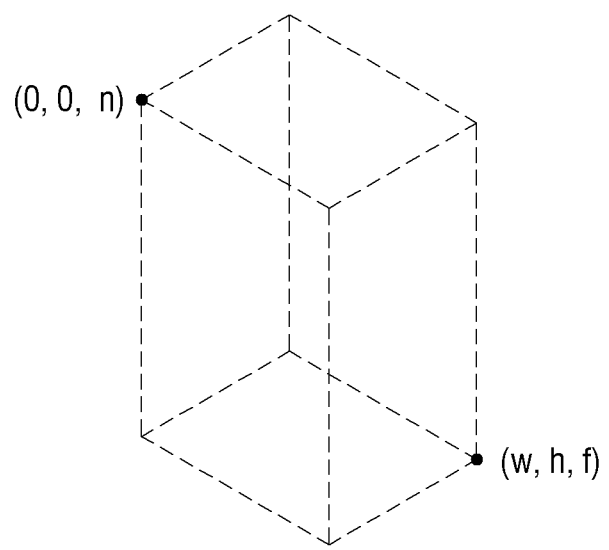
FIG. 8 is an illustrative view for describing a method of using depth information at the time of rendering a stroke using point primitives according to an exemplary embodiment of the present disclosure.

FIG. 8 is an illustrative view for describing a method of using depth information at the time of rendering a stroke using point primitives according to an exemplary embodiment of the present disclosure. Here, the depth information, which is information indicating a sequence of input strokes, may be depth values (for example, natural numbers) changed whenever the styles of the input strokes are changed and granted to the corresponding strokes, according to an exemplary embodiment of the present disclosure.

When a redraw region is identified, the processor 230 of the display device 200 may provide position information and depth information of the respective point primitives configuring strokes included in the identified redraw region to the graphic processing unit 220. For example, in the case in which an x-axis and y-axis coordinate of any point primitive configuring the strokes included in the redraw region is (x+x0, y+y0) and a dept value thereof is d0, the processor 230 may provide position information and depth information of the corresponding point primitive in a form such as (x0, y0, d0) to the graphic processing unit 220.

That is, in the case in which a coordinate of a left upper end of the redraw region in a region of the entire display 210 is (x, y), the processor 230 may move positions of the respective point primitives in the redraw region by (−x, −y) and then provide the moved coordinate values together with the depth values of the corresponding point primitives to the graphic processing unit 220.

For example, in the case in which the coordinate of the left upper end of the redraw region is (x, y), a width and a height are w and h, respectively, and the point primitives included in the redraw region have depth values n (minimum) to f (maximum), on the basis of the entire display 210, when coordinates of the respective point primitives included in the redraw region are moved by (−x, −y) and the depth information of the respective point primitives are represented on a depth axis to represent the redraw region on a three-dimensional space, it may be represented as illustrated in FIG. 8, and the processor 230 may provide the position information and the depth information of all the point primitives configuring the strokes included in the redraw region as illustrated in FIG. 8 to the graphic processing unit 220.

Meanwhile, the processor 230 may provide the conversion information for converting the redraw region into the clip space to the graphic processing unit 220. In detail, the processor 230 may identify a maximum radius of radii of all the point primitives configuring the strokes included in the redraw region and calculate the conversion information on the basis of the identified maximum radius.

For example, in the case in which it is identified that the maximum radius of the radii of the plurality of point primitives configuring the strokes included in the redraw region as in an example of FIG. 8 is r, the processor 230 may calculate a matrix as represented by the following Equation 3 and provide the calculated matrix as the conversion information to the graphic processing unit 220.

$$\begin{pmatrix} \frac{2}{w+2r} & 0 & 0 & \frac{2r}{w+2r}-1 \\ 0 & \frac{2}{h+2r} & 0 & \frac{2r}{h+2r}-1 \\ 0 & 0 & -\frac{2}{f-n} & \frac{f+n}{f-n} \\ 0 & 0 & 0 & 1 \end{pmatrix} \quad \text{[Equation 3]}$$

Therefore, the graphic processing unit 220 may convert all the point primitives included in the redraw region as illustrated in FIG. 8 into the clip space using the position information and the depth information (for example, three-dimensional coordinate values) of the respective point primitives provided from the processor 230 and the conversion matrix of the above Equation 3.

In detail, in the example described above, in the case in which any point primitive included in the redraw region has position information and depth information of (x0, y0, d0), that is, in the case in which a moved x and y coordinate value is (x0, y0) and a depth value is d0, the graphic processing unit 220 may convert the corresponding primitive into the clip space through detailed calculation as represented by the following Equation 4.

$$\begin{pmatrix} \frac{2}{w+2r} & 0 & 0 & \frac{2r}{w+2r}-1 \\ 0 & \frac{2}{h+2r} & 0 & \frac{2r}{h+2r}-1 \\ 0 & 0 & -\frac{2}{f-n} & \frac{f+n}{f-n} \\ 0 & 0 & 0 & 1 \end{pmatrix} \begin{pmatrix} x_0 \\ y_0 \\ d_0 \\ 1 \end{pmatrix} = \quad \text{[Equation 4]}$$

$$\begin{pmatrix} \frac{2}{w+2r}(x_0+r)-1 \\ \frac{2}{h+2r}(y_0+r)-1 \\ -\frac{2}{f-n}d_0+\frac{f+n}{f-n} \\ 1 \end{pmatrix}$$

Referring to the above Equation 4, it may be seen that when the point primitive is converted from the redraw region into the clip space, calculation is performed in a state in which the depth information is reflected. As described above, the redraw region is converted into the clip space using the coordinate values of the point primitives including the depth information and the conversion matrix depending on the above Equation 3, such that even when the graphic processing unit 220 renders a plurality of strokes included in the redraw region depending on the style information and the depth information, the graphic processing unit 220 may render the plurality of strokes using the point primitives.

In this case, sine the matrix as represented by the above Equation 3 also converts a region wider than the redraw region of FIG. 8 into the clip space, point primitives positioned at a boundary of the redraw region are converted to be positioned in the clip space, and point primitives converted outside the clip space (which is a three-dimensional space since it includes the depth axis) are clipped in a subsequent process.

Meanwhile, since the region wider than the actual redraw region is converted into the clip space through the matrix as represented by the above Equation 3, in the case in which the graphic processing unit 220 reversely converts the clip space using the reverse conversion information depending on the general specifications described above, the stroke is displayed at a size smaller than an actual size.

Therefore, to correct such a problem, according to an exemplary embodiment of the present disclosure, the processor 230 may calculate the reverse conversion information as represented by the above Equation 2 using the width w and the height h of the redraw region and the maximum radius r described above and provide the calculated reverse conversion information to the graphic processing unit 220. Therefore, when the graphic processing unit 220 reversely converts the clip space using the reverse conversion information as represented by the above Equation 2, the stroke having the same size as the actual size may be rendered in the redraw region.

The following Equation 5 represents an example of detailed calculation for reversely converting the point primitives converted into the clip space through the matrix as represented by the above Equation 3 using the reverse conversion information as represented by the above Equation 2.

$$\begin{pmatrix} \frac{w+2r}{2} & 0 & 0 & -r+\frac{w+2r}{2r} \\ 0 & \frac{h+2r}{2} & 0 & -r+\frac{h+2r}{2r} \\ 0 & 0 & 0 & 0 \\ 0 & 0 & 0 & 1 \end{pmatrix} \quad \text{[Equation 5]}$$

$$\begin{pmatrix} \frac{2}{w+2r}(x_0+r)-1 \\ \frac{2}{h+2r}(y_0+r)-1 \\ -\frac{2}{f-n}d_0+\frac{f+n}{f-n} \\ 1 \end{pmatrix} = \begin{pmatrix} x_0 \\ y_0 \\ 0 \\ 1 \end{pmatrix}$$

As described above, the reverse conversion information of the above Equation 2 is obtained by correcting the parameters included in the viewport information stated in the conventional specifications according to an exemplary embodiment of the present disclosure, and (−r, −r) of the respective parameters included in the above Equation 2 indicates a coordinate value of a left upper end of the viewport and (w+2r, h+2r) thereof indicate a width and a height of the viewport, respectively.

For example, the graphic processing unit 220 may calculate the reverse conversion matrix such as the leftmost matrix of the above Equation 5 using the parameters included in the viewport information of the above Equation 2 and calculate a coordinate value of the point primitive on the clip space in the calculated reverse conversion matrix to perform reverse conversion.

However, a detailed method of performing the reverse conversion using the respective parameter values included in the reverse conversion information of the above Equation 2 by the graphic processing unit 220 is not limited thereto, and as described above, the methods according to the conventional specifications may be used.

As described above, according to diverse exemplary embodiments of the present disclosure, the strokes are rendered using the point primitives, such that an amount of vertices that are to be processed by the graphic processing unit is decreased and the number of rendering pipelines that are to be performed to render the same number of strokes is decreased. Therefore, a rendering time may be shortened and the consumed current may be decreased, such that high performance stroke rendering may be performed.

In addition, as described above, the strokes are rendered using the conversion and the reverse conversion matrices changed using the maximum radius of the point primitives, such that the stroke disconnection phenomenon that may occur at the boundary of the redraw region may be prevented, and even though the strokes having the same pen style are rendered by one rendering pipeline, the depth information of the strokes is used, such that the sequence of the strokes input by the user may be represented.

Figure 9:
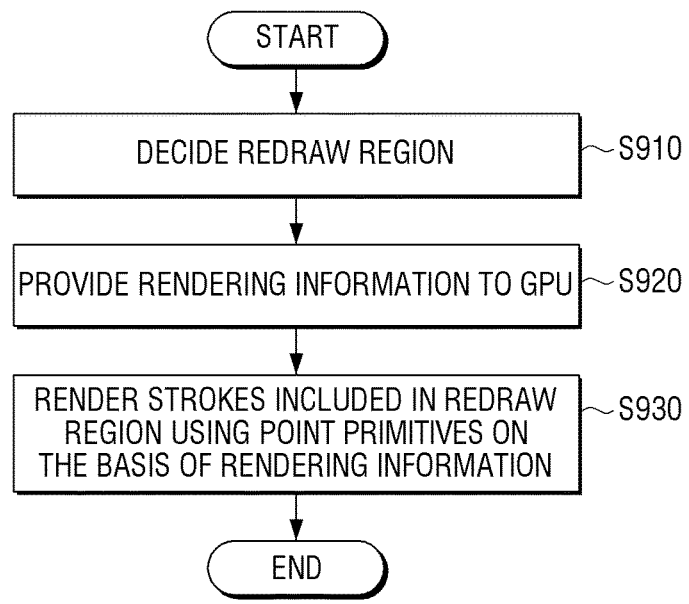
FIG. 9 is a flow chart illustrating a method of controlling a display device according to an exemplary embodiment of the present disclosure.

FIG. 9 is a flow chart illustrating a method of controlling a display device 100 or 200 including a graphic processing unit 120 or 220 according to an exemplary embodiment of the present disclosure. According to FIG. 9, when the redraw event occurs on the image including the strokes, the display device 100 or 200 identifies the redraw region (S910), and provides the rendering information for rendering the strokes included in the identified redraw region to the graphic processing unit 120 or 220 (S920).

Here, the rendering information may include at least one of the position information of the point primitives configuring the strokes included in the redraw region, the conversion information for converting the region wider than the redraw region into the clip space, the reverse conversion information for reversely converting the region wider than the redraw region, converted into the clip space, and the style information and the depth information of the input strokes.

In detail, the display device 100 or 200 may calculate the conversion information and the reverse conversion information on the basis of the maximum radius of the radii of the plurality of point primitives configuring the strokes included in the redraw region, and provide the calculated conversion information and reverse conversion information to the graphic processing unit 120 or 220.

For example, when a width of the redraw region is w, a height of the redraw region is h, and the maximum radius of the radii of the plurality of point primitives configuring the strokes included in the redraw region is r, the display device 100 or 200 may calculate the matrix as represented by the above Equation 1 as the conversion information, calculate the viewport information as represented by the above Equation 2, and provide the calculated conversion information and viewport information to the graphic processing unit 120 or 220. Here, the viewport information is the reverse conversion information for reversely converting the clip space converted by the above Equation 1.

Meanwhile, according to an exemplary embodiment of the present disclosure, the display device 100 or 200 further includes a touch input receiving input strokes, and may allocate and store depth information to the strokes input through the touch input. In detail, when styles of the strokes input through the touch input are changed, the display device 100 or 200 may change and allocate the depth information, and may match and store the allocated depth information to the corresponding strokes. In addition, the display device 100 or 200 may store the style information of the respective strokes input through the touch input.

Therefore, when the redraw event occurs on the image including the strokes, the display device 100 or 200 may identify the redraw region (S910), and provide the depth information and the style information for the strokes included in the identified redraw region as the rendering information to the graphic processing unit 120 or 220 (S920).

As described above, when various rendering information is provided to the graphic processing unit 120 or 220, the graphic processing unit 120 and 220 may render the strokes included in the redraw region using the point primitives on the basis of the rendering information (S930). In detail, the graphic processing unit 120 or 220 may convert the redraw region into the clip space on the basis of the conversion information, and render the strokes included in the redraw region using the point primitives configuring the strokes included in the converted clip space.

For example, the graphic processing unit 120 or 220 may convert the region wider than the redraw region into the clip space using the conversion matrix information as represented by the above Equation 1 and reversely convert the converted clip space using the viewport information as represented by the above Equation 2 to render the strokes included in the redraw region.

In addition, the graphic processing unit 120 or 220 may render the strokes included in the redraw region using the point primitives on the basis of the depth information and the style information. In detail, the graphic processing unit 120 or 220 may simultaneously render the strokes having the same style information among the strokes included in the redraw region. In addition, the graphic processing unit 120 or 220 may render the intersection points between the strokes having the different style information among the strokes included in the redraw region depending on the depth information. In detail, the graphic processing unit 120 or 220 may render the intersection points between the strokes having the different style information using a stroke of which a depth value included the depth information is low among the strokes having the different style information.

Figure 10:
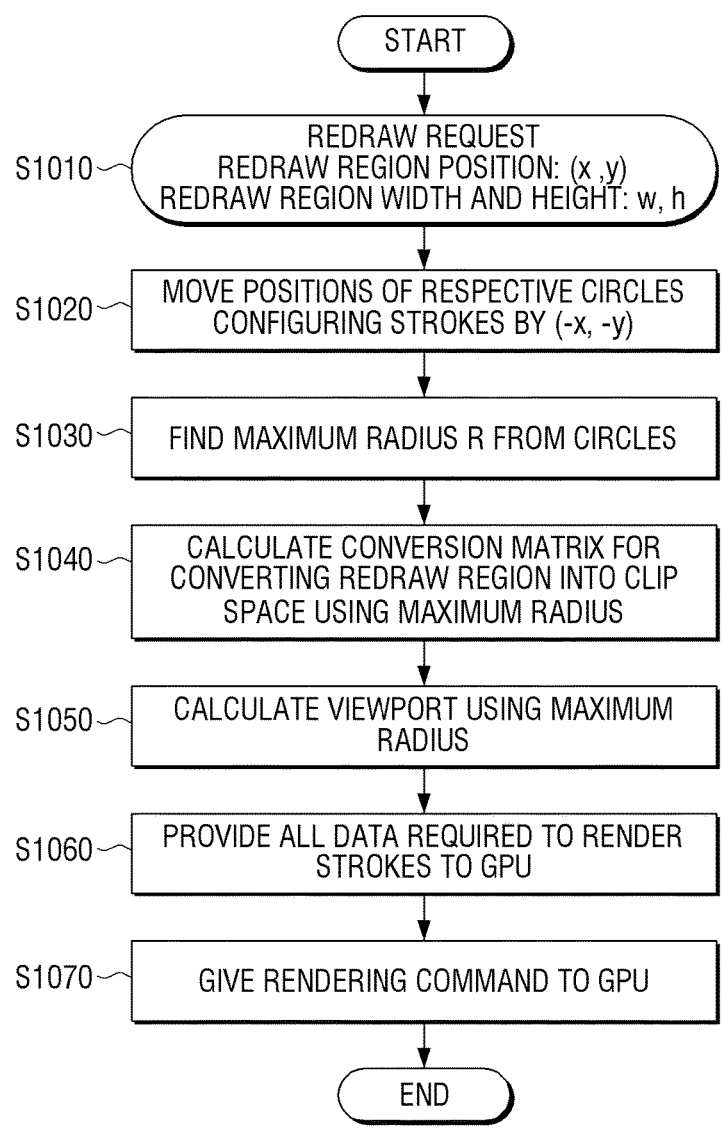
FIG. 10 is a flow chart illustrating a method of rendering a stroke by a display device according to an exemplary embodiment of the present disclosure in detail.

FIG. 10 is a flow chart illustrating a method of rendering a stroke by a display device according to an exemplary embodiment of the present disclosure in detail. According to FIG. 10, when a redraw request is received due to the occurrence of the redraw event, the display device 100 or 200 may identify the redraw region (S1010) Here, in the case in which the coordinate of the left upper end of the identified redraw region is (x, y) in the screen of the entire display and the width and the height of the identified redraw region are w and h, respectively, the display device 100 or 200 moves positions of the respective circles, that is, the respective point primitives, configuring the strokes included in the redraw region by (−x, −y) (S1020).

Then, the display device 100 or 200 finds the maximum radius among the radii of the plurality of point primitives configuring the strokes included in the redraw region (S1030), and calculates the conversion matrix for converting the redraw region into the clip space using the found maximum radius (S1040). In this case, the conversion matrix may be represented by the above Equation 1. In addition, the display device 100 or 200 may calculate the viewport for reversely converting the converted clip space using the found maximum radius (S1050). In this case, the viewport may be represented by the above Equation 2.

Therefore, the display device 100 or 200 may provide all the information required for the graphic processing unit 120 or 200 to render the strokes, including the position information indicating that the positions of the point primitives configuring the strokes included in the redraw region are moved by (−x, −y), the calculated conversion matrix, the calculated viewport, and the like, to the graphic processing unit 120 or 220 (S1060), and give a rendering command to the graphic processing unit 120 or 220 (S1070).

Figure 11:
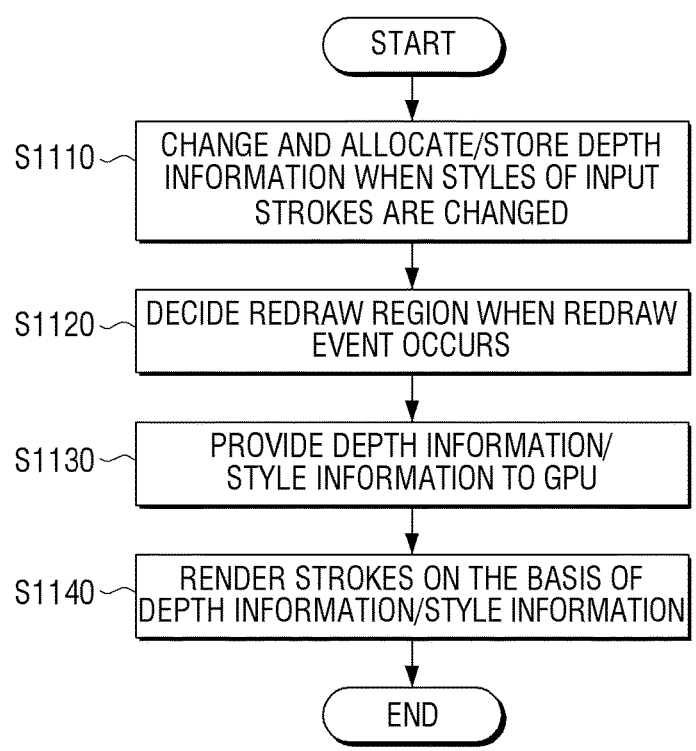
FIG. 11 is a flow chart illustrating a method of controlling a display device according to another exemplary embodiment of the present disclosure.

FIG. 11 is a flow chart illustrating a method of controlling a display device including a graphic processing unit according to another exemplary embodiment of the present disclosure. According to FIG. 11, the display device 100 or 200 includes the touch input, and may allocate and store the depth information to the input strokes when the strokes are input through the touch input.

In detail, when the styles of the input strokes are changed, the display device 100 or 200 may change and allocate the depth information, and may match and store the allocated depth information to the corresponding strokes (S1110). In addition, the display device 100 or 200 may match and store the style information of the strokes input through the touch input to the corresponding strokes.

Then, when the redraw event occurs, the display device 100 or 200 may identify the redraw region (S1120), and provide the depth information and the style information for the strokes included in the redraw region among the stored depth information and style information to the graphic processing unit 120 or 220 (S1130).

Therefore, the graphic processing unit 120 or 220 may render the strokes included in the redraw region using the depth information and the style information. In this case, the graphic processing unit 120 or 220 may render the strokes using various primitives such as triangle primitives, point primitives, and the like.

In detail, the graphic processing unit 120 or 220 may simultaneously render the strokes having the same style information among the strokes included in the redraw region. In addition, the graphic processing unit 120 or 220 may render the intersection points between the strokes having the different style information among the strokes included in the redraw region depending on the depth information. In detail, the graphic processing unit 120 or 220 may render the intersection points between the strokes having the different style information using the stroke of which the depth value included in the depth information is low among the strokes having the different style information.

Hereinabove, the operations of the display device 100 or 200 described through FIGS. 9 to 11 may be performed by the processor 130 or 230 of the display device 100 or 200 according to an exemplary embodiment.

According to the diverse exemplary embodiments of the present disclosure as described above, the stroke rendering performance of the display device may be improved, and the consumed power may be decreased.

Meanwhile, according to the operations of the processor of the display device or the methods of controlling a display device according to the diverse exemplary embodiments described above may be created as software and be installed in the display device.

For example, a non-transitory computer readable medium in which a program is stored may be installed, the program performing the method of controlling a display device including identifying the redraw region when the redraw event occurs on the displayed image, providing the rendering information for rendering the strokes included in the redraw region to the graphic processing unit, and rendering, by the graphic processing unit, the strokes included in the redraw region using the point primitives on the basis of the rendering information.

Here, the non-transitory computer readable medium is not a medium that stores data therein for a while, such as a register, a cache, a memory, or the like, but means a medium that semi-permanently stores data therein and is readable by a device. In detail, the various middleware or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

The spirit of the present disclosure is illustratively described hereinabove. It will be appreciated by those skilled in the art that various modifications and alterations may be made without departing from the essential characteristics of the present disclosure. In addition, the exemplary embodiments of the present disclosure are not to limit the spirit of the present disclosure, but are to describe the spirit of the present disclosure, and the scope of the present disclosure is not limited by the exemplary embodiments. Therefore, the scope of the present disclosure should be interpreted by the following claims, and it is to be interpreted that all the spirits equivalent to the following claims fall within the scope of the present disclosure.

The invention claimed is:

1. A display device comprising:
   a touch interface configured to detect manual strokes from a user that are applied to the display device;
   a graphic processing unit configured to render displayable strokes based on the manual strokes;
   a display configured to display an image including the rendered strokes; and
   a processor configured to:
   identify a redraw region of the image including the rendered strokes where at least a portion of at least one stroke is redrawn, when a redraw event occurs on the image, and
   provide rendering information for rendering the at least one stroke included in the redraw region to the graphic processing unit,
   wherein the graphic processing unit is further configured to render the at least one stroke included in the redraw region using point primitives on the basis of the rendering information, and
   wherein the rendering information includes conversion information for converting a region wider than the redraw region into a clip space, and reverse conversion information for reversely converting the region wider than the redraw region.

2. The display device as claimed in claim 1, wherein the graphic processing unit is configured to convert the redraw region into the clip space on the basis of the conversion information and render the at least one stroke included in the redraw region using point primitives configuring strokes included in the converted clip space.

3. The display device as claimed in claim 1, wherein the processor is configured to calculate the conversion information on the basis of a maximum radius of radii of a plurality of point primitives configuring the at least one stroke included in the redraw region.

4. The display device as claimed in claim 3, wherein the conversion information includes the following matrix:

$$\begin{pmatrix} \frac{2}{w+2r} & 0 & 0 & \frac{2r}{w+2r}-1 \\ 0 & \frac{2}{h+2r} & 0 & \frac{2r}{h+2r}-1 \\ 0 & 0 & 0 & 0 \\ 0 & 0 & 0 & 1 \end{pmatrix}$$

where w indicates a width of the redraw region, h is a height of the redraw region, and r is the maximum radius.

5. The display device as claimed in claim 1,
   wherein the processor is configured to calculate the reverse conversion information using a maximum radius of radii of a plurality of point primitives configuring the at least one stroke included in the redraw region.

6. The display device as claimed in claim 5, wherein the reverse conversion information includes the following viewport information:

$$(-r,-r,w+2r,h+2r)$$

where w indicates a width of the redraw region, h is a height of the redraw region, and r is the maximum radius.

7. The display device as claimed in claim 1,
   wherein the rendering information includes depth information and style information of each of a plurality of strokes included in the redraw region, and the processor is configured to change and allocate the depth information whenever styles of the strokes applied through the touch interface are changed.

8. The display device as claimed in claim 7, wherein the graphic processing unit is configured to simultaneously render strokes having the same style information among a plurality of strokes included in the redraw region.

9. The display device as claimed in claim 8, wherein the graphic processing unit is configured to render intersection points between strokes having different style information among a plurality of strokes included in the redraw region depending on the depth information.

10. The display device as claimed in claim 9, wherein the graphic processing unit is configured to render the intersection points between the strokes having the different style information using a stroke of which a depth value included in the depth information is low among the strokes having the different style information.

11. A method of controlling a display device including a graphic processing unit, comprising:
    detecting manual strokes from a user that are applied to the display device via a touch interface;
    rendering displayable strokes based on the manual strokes with the graphic processing unit;
    displaying an image including the rendered strokes on the display device;
    identifying, with a processor, a redraw region of the image including the rendered strokes where at least a portion of at least one stroke is redrawn, when a redraw event occurs on an image including strokes;
    providing, with the processor, rendering information for rendering the at least one stroke included in the redraw region to the graphic processing unit; and
    rendering, by the graphic processing unit, the at least one stroke included in the redraw region using point primitives on the basis of the rendering information,
    wherein the rendering information includes conversion information for converting a region wider than the redraw region into a clip space, and reverse conversion information for reversely converting the region wider than the redraw region.

12. The method of controlling a display device as claimed in claim 11, wherein the rendering includes:
    converting the redraw region into the clip space on the basis of the conversion information; and
    rendering the at least one stroke included in the redraw region using point primitives configuring strokes included in the converted clip space.

13. The method of controlling a display device as claimed in claim 11, wherein the providing includes calculating the conversion information on the basis of a maximum radius of radii of a plurality of point primitives configuring the strokes included in the redraw region.

* * * * *